(12) United States Patent
Monaghan et al.

(10) Patent No.: US 10,804,787 B2
(45) Date of Patent: Oct. 13, 2020

(54) SECONDARY PART FOR AN IRONLESS LINEAR MOTOR, AND IRONLESS LINEAR MOTOR

(71) Applicant: ETEL S.A., Motiers (CH)

(72) Inventors: Sean David Monaghan, County Fermanagh (GB); Vivien Baverel, Morteau (FR)

(73) Assignee: ETEL S.A., Motiers (CH)

( * ) Notice: Subject to any disclaimer, the term of this patent is extended or adjusted under 35 U.S.C. 154(b) by 148 days.

(21) Appl. No.: 16/155,907

(22) Filed: Oct. 10, 2018

(65) Prior Publication Data
US 2019/0115817 A1     Apr. 18, 2019

(30) Foreign Application Priority Data

Oct. 12, 2017   (EP) .................................... 17196215

(51) Int. Cl.
| | | |
|---|---|---|
| *H02K 41/03* | (2006.01) | |
| *H02K 3/47* | (2006.01) | |
| *H02K 1/34* | (2006.01) | |
| *H02K 29/03* | (2006.01) | |
| *H02K 1/17* | (2006.01) | |

(52) U.S. Cl.
CPC ............. *H02K 41/033* (2013.01); *H02K 3/47* (2013.01); *H02K 41/031* (2013.01); *H02K 1/17* (2013.01); *H02K 1/34* (2013.01); *H02K 29/03* (2013.01); *H02K 2201/03* (2013.01); *H02K 2213/12* (2013.01)

(58) Field of Classification Search
CPC .......................... H02K 41/031; H02K 41/033
See application file for complete search history.

(56) References Cited

U.S. PATENT DOCUMENTS

| | | | |
|---|---|---|---|
| 4,749,921 A | 6/1988 | Chitayat | |
| 6,160,327 A | 12/2000 | Wang | |
| 7,291,953 B1 * | 11/2007 | Smith | ............... H02K 41/03 310/112 |
| 7,808,133 B1 | 10/2010 | Widdowson et al. | |

(Continued)

FOREIGN PATENT DOCUMENTS

| | | |
|---|---|---|
| DE | 102015222265 A1 | 5/2017 |
| EP | 0949749 A1 | 10/1999 |

(Continued)

*Primary Examiner* — Ramon M Barrera
(74) *Attorney, Agent, or Firm* — Leydig, Voit & Mayer Ltd.

(57) ABSTRACT

A secondary part, which defines a magnetic path for a primary part of a linear motor, includes a spacer element having a plurality of mounting points that, in an application, are configured to fasten the secondary part. Two yoke plates that form lateral sides are configured to be fastened to the spacer element such that the two yoke plates extend in mutual opposition, orthogonally to the magnetic path. The two yoke plates are configured to accommodate a plurality of permanent magnets on respective inner sides thereof. The two yoke plates have, on respective outer sides thereof, a reinforcing structure that is formed by a periodic variation of plate thickness in the direction of the magnetic path. Local minima of the reinforcing structure overlapping with the mounting points along the direction of the magnetic path.

18 Claims, 6 Drawing Sheets

(56) References Cited

U.S. PATENT DOCUMENTS

| | | |
|---|---|---|
| 7,989,993 B1 | 8/2011 | Li et al. |
| 2006/0175907 A1 | 8/2006 | Shikayama et al. |
| 2007/0052303 A1 | 3/2007 | Thirunarayan-Kumar et al. |
| 2015/0162812 A1 | 6/2015 | Da Conceiç O Rosa |
| 2017/0225927 A1 | 8/2017 | Kirsch et al. |
| 2019/0006902 A1 | 1/2019 | Fernandes Goncalves et al. |

FOREIGN PATENT DOCUMENTS

| | | |
|---|---|---|
| EP | 2884638 A1 | 6/2015 |
| EP | 3422537 A1 | 1/2019 |
| WO | WO 2016050407 A1 | 4/2016 |

* cited by examiner

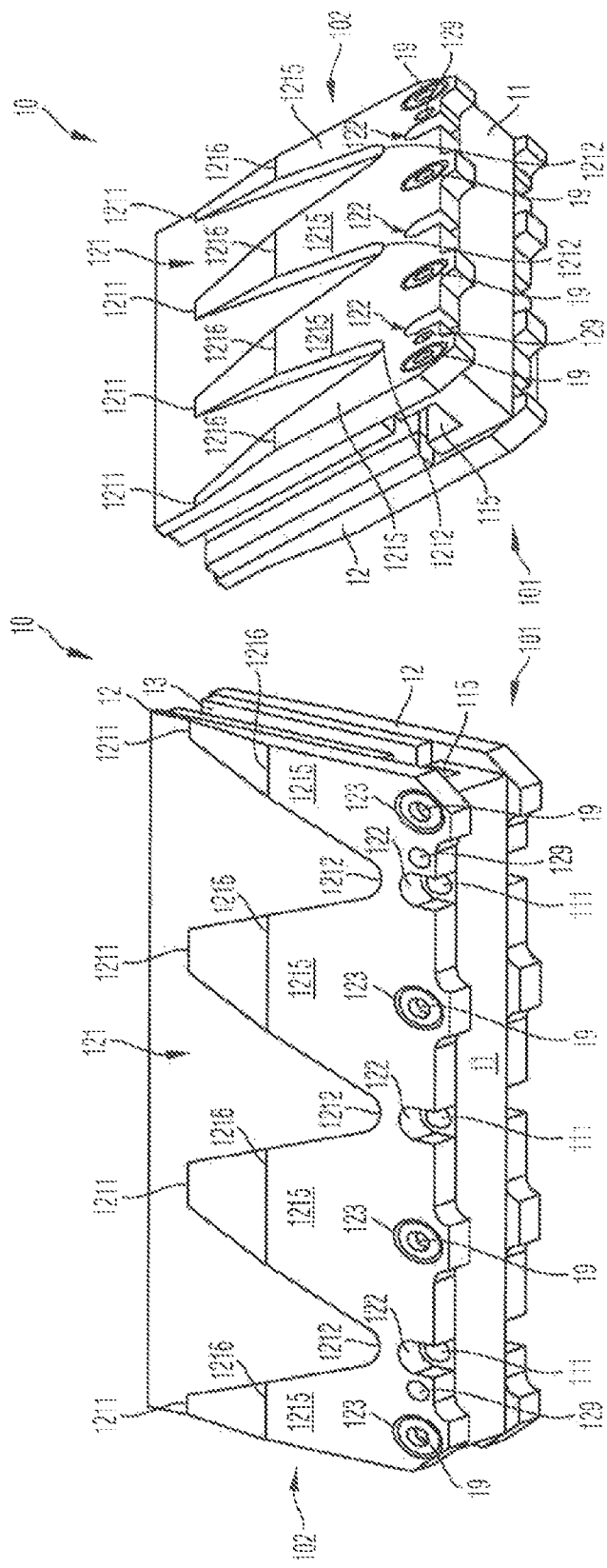

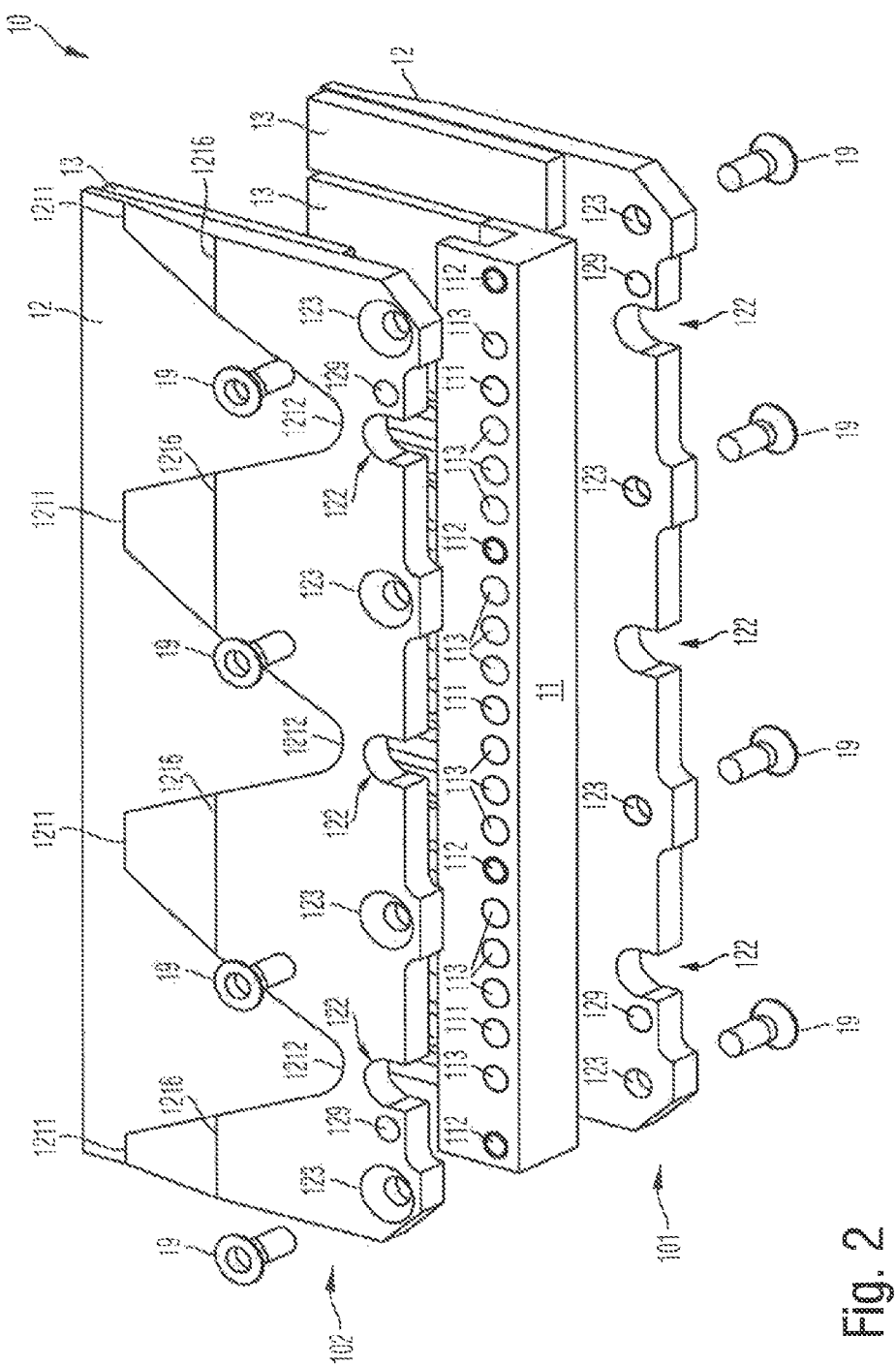

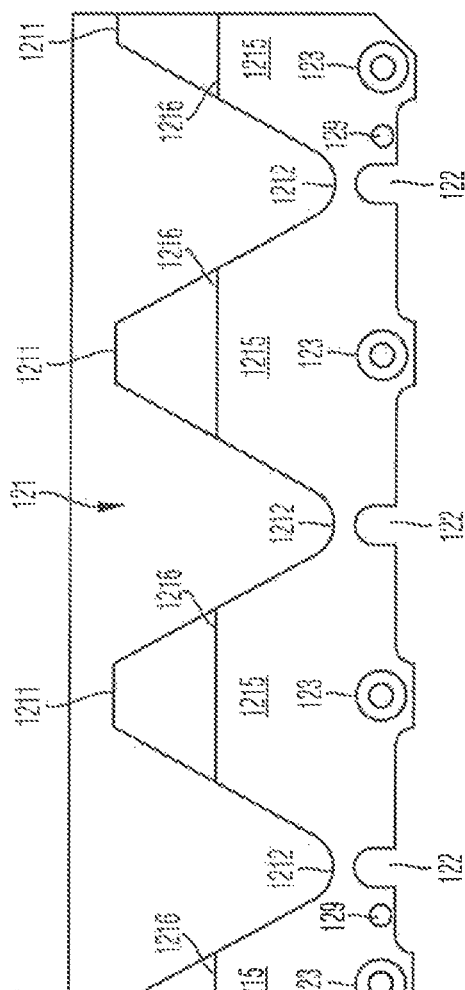
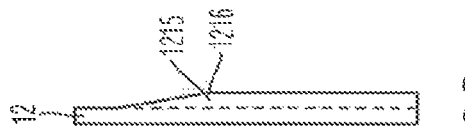
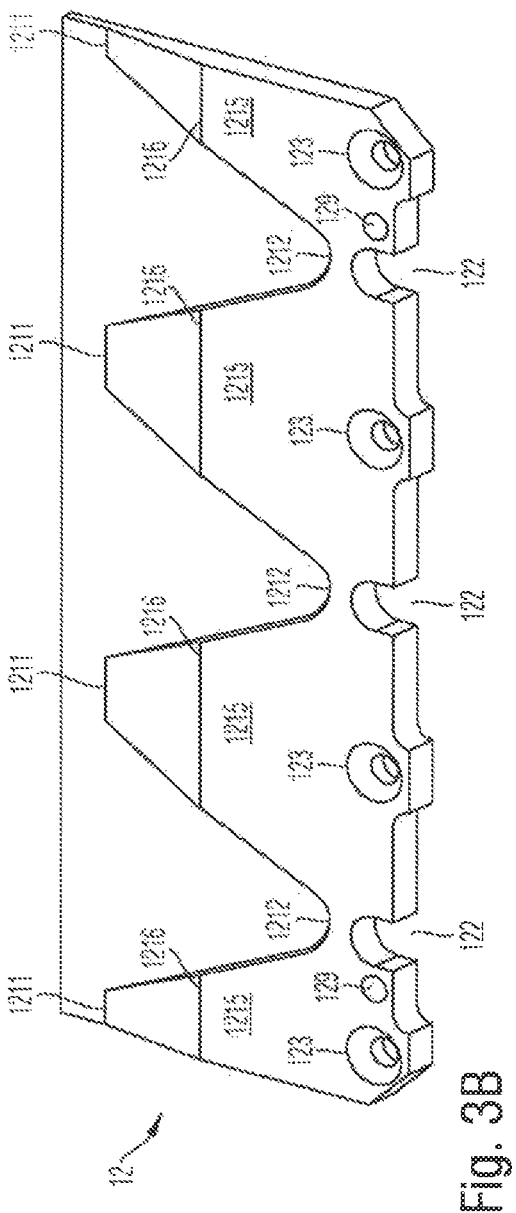

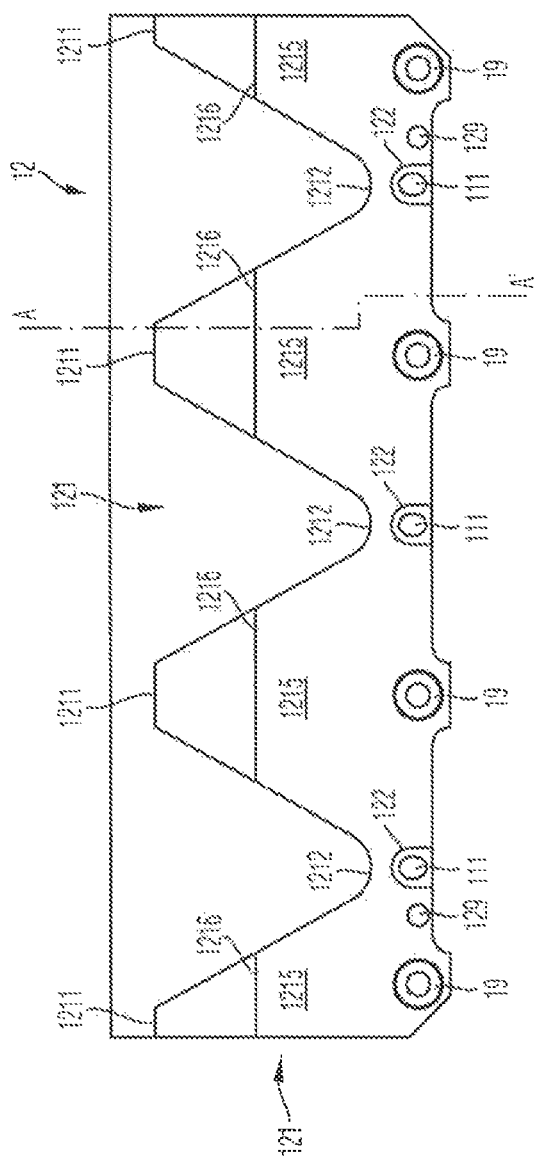
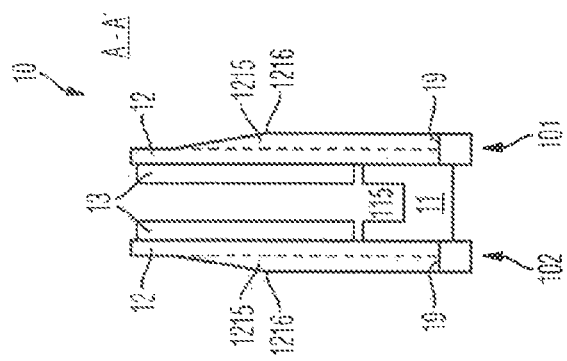

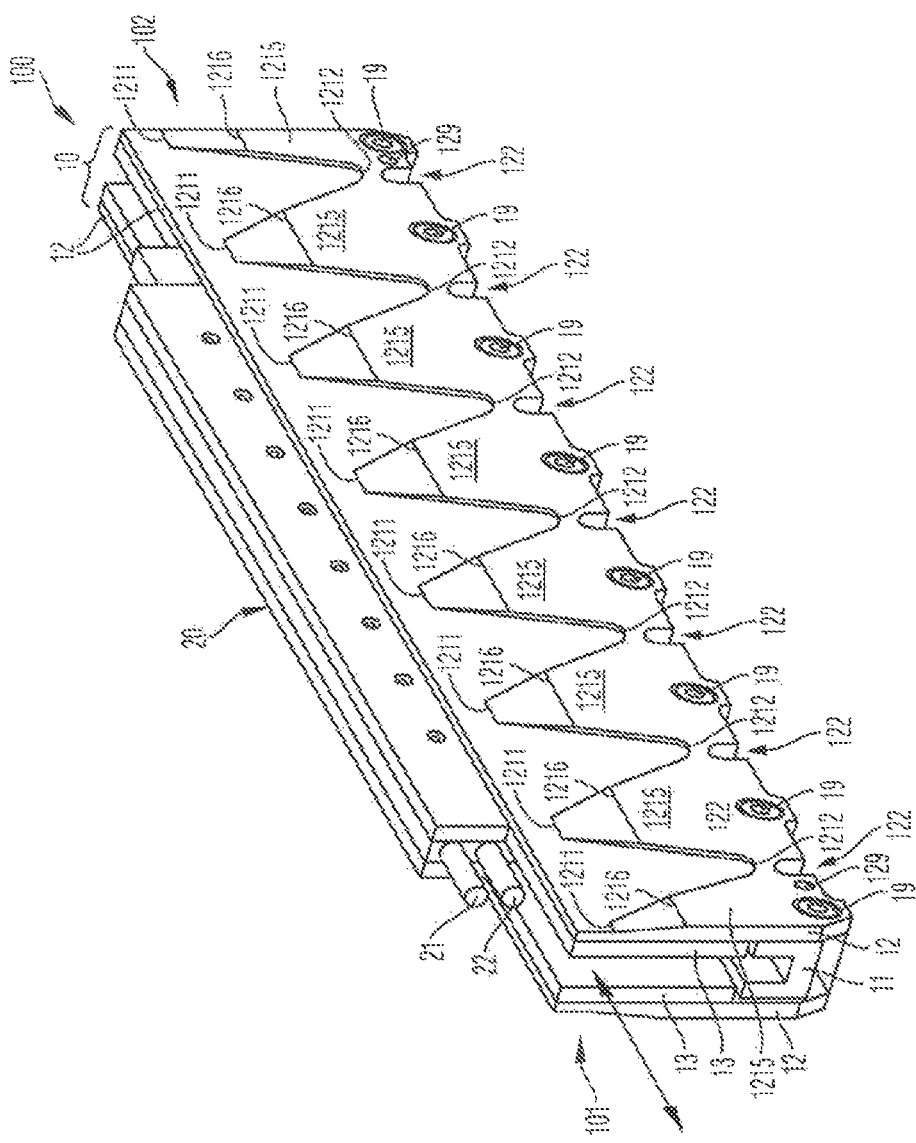

SECONDARY PART FOR AN IRONLESS LINEAR MOTOR, AND IRONLESS LINEAR MOTOR

CROSS-REFERENCE TO PRIOR APPLICATION

Priority is claimed to European Patent Application No. EP 17196215.2, filed on Oct. 12, 2017, the entire disclosure of which is hereby incorporated by reference herein.

FIELD

The present invention relates to a secondary part for a linear motor, especially to a secondary part for an ironless linear motor, as well as to an ironless linear motor.

BACKGROUND

Examples of an ironless linear motor (thus, coreless linear motors are meant, in particular) are discussed in U.S. Patent Application 2006/0175907 A1, U.S. Pat. No. 4,749,921 and European Patent Application EP 2 884 638 A1. Moreover, European Patent Application EP 17178938.1 describes aspects of an ironless linear motor, in particular of the primary part for an ironless linear motor.

Linear motors are used, for example, when there is a need for highly accurate and, in some instances, also rapid positioning of objects, such as a machine part of a machine tool. The primary part of the linear motor can thereby be directly connected via a suitable interface to the machine part to be moved or to some other object. In contrast to a conventional rotary motor, this means that the need is usually eliminated for interposing a gear mechanism between the linear motor and the object to be driven.

What are generally referred to as ironless linear motors are primarily suited for applications that require an especially precise positioning where at least one coil provided on the primary part does not have an associated core, such as an iron core. Disturbing cogging thrusts can thereby be avoided. However, to be able to generate high enough forces on the primary part of the linear motor, even without a core, correspondingly higher coil currents are required. The coils are provided in the form of preformed individual coils, for example. This means that the wire used to form the coils, which is provided with an insulation layer, for example, is not directly wound onto a core, rather, for example, wound without a core and then installed to produce the electric motor. In this case, the coreless single coil can be placed on an iron core integrated in the electric motor; however, the single coil can also be operated as what is generally referred to as an "air coil" in the electric motor without an associated core.

A low weight is advantageous when a linear motor is to be used for a highly accurate and, in some instances, also rapid positioning of objects, such as of a machine part of a machine tool, for example. It is not only the primary part which, as mentioned, is provided without an iron core, that presents a challenge.

The secondary part of the linear motor, for example, should also be weight optimized. This is particularly the case, for example, when the secondary part, together with the primary part, thus the entire motor, is coupled to the primary part of another motor, for example, to realize an X-Y drive.

At the same time, the secondary part must meet stability requirements.

In this connection, it is problematic that the yoke plates, which are equipped with permanent magnets and form the magnetic path for the primary part, are subject to constant forces due to the magnetic field of the permanent magnets. This can lead to bending and thus deformation of the magnetic path.

Excessive bending or deformation of the secondary part could lead to the primary part contacting the secondary part and thereby damaging the very sensitive magnets. It is absolutely essential to avoid this contacting and/or damage.

One possibility would be to enlarge the air gap (greater tolerance to deformation). However, this would be accompanied by performance losses. It is, therefore, preferable to reinforce the secondary part.

In this connection, U.S. Pat. No. 7,989,993 B1, as well as U.S. Patent Application 2007/0052303 A1 describe providing the external surfaces of the yoke plates with reinforcing structures whose purpose is to counter the occurrence of the aforesaid bending.

SUMMARY

In an embodiment, the present invention provides a secondary part, which defines a magnetic path for a primary part of a linear motor. The secondary part includes a spacer element having a plurality of mounting points that, in an application, are configured to fasten the secondary part. Two yoke plates that form lateral sides are configured to be fastened to the spacer element such that the two yoke plates extend in mutual opposition, orthogonally to the magnetic path. The two yoke plates are configured to accommodate a plurality of permanent magnets on respective inner sides thereof. The two yoke plates have, on respective outer sides thereof, a reinforcing structure that is formed by a periodic variation of plate thickness in the direction of the magnetic path. Local minima of the reinforcing structure overlapping with the mounting points along the direction of the magnetic path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1A and FIG. 1B each show exemplarily and schematically a detail of a perspective view of a secondary part in accordance with one or a plurality of specific embodiments;

FIG. 2 shows exemplarily and schematically a detail of a perspective vertical section view of a secondary part in accordance with one or a plurality of specific embodiments;

FIG. 3A-C show exemplarily and schematically a respective detail of a plan view, a perspective view, and of a cross-sectional view of a yoke plate in accordance with one or a plurality of specific embodiments;

FIG. 4A-B show exemplarily and schematically a respective detail of a plan view and of a cross-sectional view of a secondary part in accordance with one or a plurality of specific embodiments;

FIG. 6 shows exemplarily and schematically a detail of a perspective view of a linear motor in accordance with one or a plurality of specific embodiments.

DETAILED DESCRIPTION

Figure 5:
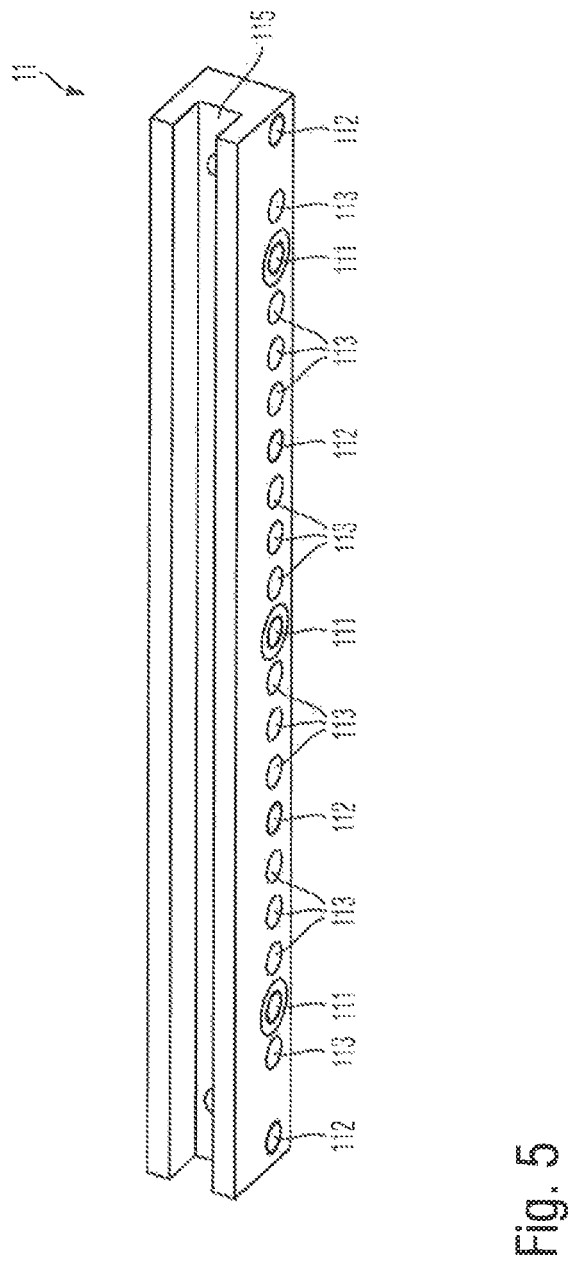
FIG. 5 shows exemplarily and schematically a detail of a perspective view of a spacer element in accordance with one or a plurality of specific embodiments.

Embodiments of the present invention make it possible to advantageously orient the placement and configuration of a reinforcing structure to the remaining components of the secondary part.

In accordance with a first embodiment, a secondary part defines a magnetic path for a primary part of a linear motor. The secondary part includes: a spacer element, two yoke plates that form lateral sides and are adapted for a fastening to the spacer element, so that they extend in mutual opposition, orthogonally to the magnetic path. The two yoke plates are adapted to accommodate a plurality of permanent magnets on the respective inner sides thereof. On the respective outer sides thereof, the two yoke plates each feature a reinforcing structure that is formed by a periodic variation of the plate thickness in the direction of the magnetic path. The spacer element has a number of mounting points that, in an application, are designed for a fastening of the secondary part, local minima of the reinforcing structure overlapping with the mounting points along the direction of the magnetic path.

A second embodiment provides an ironless linear motor which has a secondary part in accordance with the first embodiment.

Reference is made in the following to both of the aforementioned embodiments.

The linear motor is an ironless (thus a coreless) linear motor, for example, where the coils of the primary part are formed without a core.

The secondary part is provided as a type of base profile configuration having a U-shaped cross section, for example, which is essentially formed by the spacer element, the two yoke plates and the permanent magnets. Other components, such as fastening elements and the like, may likewise be part of the base profile configuration. In the same way, it is possible to provide a plurality of spacer elements, which are adjacently disposed, for example, in the longitudinal direction of the secondary part, as well as, correspondingly, a plurality of yoke plates.

A specific embodiment provides that the spacer element be configured along the magnetic path to guide a primary part.

A groove-type recess of the spacer element into which the primary part is partially seated, forms the base of the magnetic path, for example. The yoke plates form the two lateral sides of the U-shaped cross section, for example. They are fastened to the spacer element and extend upwards therefrom, namely orthogonally to the longitudinal extent of the groove-type recess, thus orthogonally to the direction of the magnetic path.

The yoke plates are made of an iron material, for example. They are adapted to accommodate the permanent magnets on the respective inner sides thereof. The permanent magnets are arranged in alternating polarity ("north, south, north, south, north, south . . . ") in the longitudinal direction of the secondary part; the order on the other secondary part side, thus on the opposite yoke plate, being complementary ("south, north, south, north, south, north . . . "), thereby ensuring that the north and south poles always oppose one another. The permanent magnets are in the form of magnetic plates, for example, and are spaced apart at a small distance of 1 to 3 mm, for example. A width of a magnetic plate along the longitudinal extent of the secondary part is approximately one or several centimeters, for example.

The spacer element is likewise made of an iron material, for example.

As an alternative to iron, other materials having a high magnetic permeability are possible, both for the spacer element, as well as for the yoke plates.

When the yoke plates are equipped with the permanent magnets and are fastened to the spacer element, the permanent magnets are in alignment with the lateral sides of the spacer element, for example, that define the groove-type recess, for example.

To fasten the secondary part to a machine part, for example, in an application, the spacer element includes a number of mounting points, which are provided in the form of mounting cut-outs, for example. The mounting points are each provided in the form of a threaded bore, for example. The secondary part is then fastened to the machine part by threaded members that engage in the mounting cut-outs, for example. A specific embodiment provides that the yoke plates are not affected in the application by the fastening of the secondary part. Thus, the threaded members, used for the fastening, only affect the spacer element, not, however, the yoke plates.

A reinforcing structure is mounted in each case on the outer sides of the yoke plates. The reinforcing structure may be monolithically integrated in the particular yoke plate as the yoke plate is subject to a milling process or the like, for example, or the reinforcing structure is installed as a separate element on the yoke plate, for example, adhesively bonded thereto or fastened in some other way. Thus, in a specific embodiment, a thicker plate is tapered by a milling operation or similarly structurally formed and locally narrowed in terms of the thickness thereof; and, in the other specific embodiment, an initially thinner plate is provided with a separately manufactured reinforcing structure.

Regardless of which of the two specific embodiments described above is provided, the reinforcing structure, which is formed by a periodic variation of the plate thickness in the direction of the magnetic path, is designed in such a way that local minima of the reinforcing structure along the direction of the magnetic path overlap with the mounting points of the spacer element. The magnetic path extends parallel to the longitudinal extent of the secondary part, for example.

Thus, the mounting points are provided in the spacer element at regular intervals along the longitudinal direction of the secondary part. In the longitudinal direction, respectively in the direction of the magnetic path, they overlap with the local minima of the reinforcing structure.

In a specific embodiment, exactly one mounting point is associated with each local minimum of the reinforcing structure of one of the two yoke plates. The reinforcing structures of the two yoke plates are arranged relative to each other without any offset, for example; in this respect, when the mounting point is configured as a through-extending cut-out, two minima may also be associated with each mounting point.

Because of the reinforcing structure, the thickness of the respective yoke plate is not constant in the longitudinal direction. In the longitudinal direction, the thickness regularly changes from a low value to a high value, for example, it being possible for the value difference to be within the range of from 2 to 4 mm. A basic thickness of the yoke plate, for example, in the lower portion thereof, is 6 mm, for example. Per period of the reinforcing structure, the value changes once from the low to the high value, and once from the high value back to the low value, for example.

In an embodiment, the reinforcing structure is designed in such a way that the section along which the thickness of the yoke plate has the higher value per period, decreases with increasing height of the yoke plate. Conversely, in this embodiment, the reinforcing structure is designed in such a way that, at the lowest level thereof, the section, along which the thickness of the yoke plate has the low value per period, is minimal. Depending on the configuration of the reinforcing structure (at the same time), this section may even turn out to be nearly punctiform.

Wherever the section is minimal and the thickness of the yoke plate per period of the reinforcing structure along this section has the low value, there is a "local minimum" of the reinforcing structure. At these locations, the yoke plate reinforcement provided by the reinforcing structure is, therefore, the least effective (with regard to preventing the bending described at the outset).

Wherever the section is minimal and the thickness of the yoke plate per period of the reinforcing structure has the higher value, there is a "local maximum" of the reinforcing structure. Therefore, at these locations, the yoke plate reinforcement provided by the reinforcing structure is the most effective (with regard to preventing the bending described at the outset).

A specific embodiment of the secondary part provides that the two yoke plates terminate, in the longitudinal direction, at both ends with a respective local maximum of the reinforcing structure.

For example, in the longitudinal direction of the secondary part, two magnetic periods are provided for each period of the reinforcing structure. Each magnetic period is composed of two permanent magnets at each of the two yoke plates, which, as mentioned, are adjacently disposed in alternating polarity and opposite each other in alternating polarity. Thus, in terms of the width thereof, a period of the reinforcing structure corresponds approximately to the width of four adjacently disposed permanent magnets. The local maximum may be thereby configured in such a way that two permanent magnets are each located proximately thereto in and counter to the longitudinal direction.

Each period of the reinforcing structure may have a reinforcing element, whose width decreases along the height of the respective lateral side (formed by the respective yoke plate), for example, by at least 50% and/or linearly. The reinforcing elements of the reinforcing structure may merge seamlessly into one another. The local minima and local maxima referred to above are formed in this way, thus, minima and maxima of those portions of the sections, along which the thickness thereof either has the higher or the lower value.

Moreover, a specific embodiment of the secondary part provides that, in at least an upper partial region, each reinforcing element have a thickness that decreases along the height of the respective lateral side. Thus, the reinforcing elements may each be provided with a chamfer. The secondary part is thereby further reduced in weight. The chamfer extends along at least 10% of the overall height of the respective reinforcing element, for example.

In a specific embodiment, the reinforcing elements of the reinforcing structure each have the shape of a trapezoid or triangle. This will be explained in greater detail with reference to the exemplary embodiments illustrated in the figures. The local minima, thus those minimal portions of the sections, along which the thickness of the yoke plate has the lower value, are formed by the transition between two adjacent reinforcing elements, for example, it being possible for this transition to be "seamless."

Another specific embodiment provides that the yoke plates feature fastening bores that are configured for the purpose of fastening to the spacer element. In this regard, fastening means are guided through the fastening bores of the yoke plates and fastened to the spacer element. In the direction of the magnetic path, these fastening bores overlap with the local maxima of the reinforcing structure, thus with those portions (that may likewise turn out to be nearly punctiform) where the section, along which the thickness of the yoke plate has the higher value, is minimal. This further enhances stability.

It is, moreover, within the scope of an embodiment of the present invention that the yoke plates not be contacted by fastening elements that engage on the mounting points. To this end, the yoke plates have notches, for example, that expose the mounting points of the spacer element.

Thus, the locations where the yoke plates are fastened to the spacer element overlap with the local maxima of the reinforcing structure, and the locations where the secondary part is fastened, in an application, via the spacer element to a machine part, for example, overlap with the local minima of the reinforcing structure.

Moreover, for purposes of further weight reduction, the spacer element may have a plurality of cut-outs that remain free.

As described in German Patent Application DE 10 2015 222 265 A1 and European Patent Application EP 2 884 638 A1, the ironless linear motor of the second embodiment is designed in consideration of the electromechanical function thereof.

FIGS. 1A and B each show schematically and exemplarily a perspective view of a secondary part 10. Secondary part 10 defines a magnetic path for a primary part of a linear motor. An exemplary primary part is schematically shown in FIG. 6 and characterized there by reference numeral 20. The magnetic path extends along the direction indicated by the double arrow shown in FIG. 6 and thus in the longitudinal direction relative to secondary part 10.

Linear motor 100 is designed to be an ironless linear motor, for example, where the coils of primary part 20 do not have a core. Primary part 20 may be designed in the manner described in European Patent Application EP 17178938.1. The coils of primary part 20 are energized by a supply leads 21. One or more measurement signals, such as a temperature, for example, a temperature at one of the coils of primary part 20, are read out via a cable line 22.

Secondary part 10 of linear motor 100 is designed in accordance with one of the exemplary embodiments in accordance with FIG. 1A-B.

In accordance therewith, secondary part 10 includes a spacer element 11. In a specific embodiment, spacer element 11 is designed for guiding primary part 20 along the magnetic path.

For example, in the case of spacer element 11, a groove-type recess 115 is provided into which primary part 20 is partially seated, as illustrated in FIG. 6.

Moreover, spacer element 11 has a number of mounting points 111 that, in an application, are designed for a fastening of the secondary part. Secondary part 10 is fastened to a machine part, for example, via mounting points 111, which are also shown in FIG. 2, 4A-B. Mounting points 111 are configured as threaded bores, for example, into which fastening screws engage.

At least one yoke plate 12 is provided on each side 101 and 102 of secondary part 10. Yoke plates 12 form lateral sides as they extend in mutual opposition, orthogonally to the magnetic path. A base profile having a U-shaped cross section is thereby formed.

Yoke plates 12 feature fastening bores 123, for example, that are configured to accommodate fastening means 19 for the purpose of fastening to spacer element 11. Fastening means 19 are designed as threaded members, for example, which are guided through fastening bores 123 and engage in thread 112 of spacer element 11.

Yoke plates 12 are thereby further designed not to be contacted by fastening elements that engage on mounting points 111 of spacer element 11. To this end, yoke plates 12 have notches 122, for example, that expose mounting points 111 of spacer element 11. Mounting points 111, as well as the fastening means engaging therein do not necessarily contribute to the stability of secondary part 10. Thus, in an application, secondary part 10 is installed in such a way that the requisite fastening means couple to mounting points 111 of the spacer element, without contacting yoke plates 12. Notches 122 contribute to weight reduction.

On the inner sides, the two yoke plates 12 have a plurality of permanent magnets 13. Permanent magnets 13 are arranged in alternating polarity ("north, south, north, south, north, south . . . ") in the longitudinal direction of secondary part 10, the order on the other secondary part side, thus on the opposite yoke plate, being complementary ("south, north, south, north, south, north . . . "), thereby ensuring that the north and south poles always oppose one another. Permanent magnets 13 are in the form of magnetic plates, for example, and are spaced apart at a small distance of 1 to 3 mm, for example.

As schematically illustrated in the cross-sectional view of FIG. 4B, permanent magnets 13 align with lateral sides of spacer element 11 that form groove-type recess 115 for guiding primary part 20.

On the outer sides, the two yoke plates 12 each feature a reinforcing structure 121. The purpose of reinforcing structures 121 is to counter a magnetic force-induced bending/deformation.

On each side, reinforcing structures 121 are formed by a periodic change in plate thickness in the direction of the magnetic path (thus, in the longitudinal direction of secondary part 10). On both sides 101, 102 of secondary part 10, reinforcing structures 121 may have an identical design and also be aligned relative to one another, thus without any mutual offset in the longitudinal direction. The following always refers to "reinforcing structure 121," reinforcing structures 121 on both sides 101, 102 of the secondary part being meant.

Reinforcing structure 121 has a plurality of local maxima 1211 and local minima 1212. Wherever the section is minimal and the thickness of yoke plate 12 per period of reinforcing structure 121 along this section has the low value, there is a local minimum 1212 of reinforcing structure 121. At these locations 1212, the yoke plate reinforcement provided by reinforcing structure 121 is the least effective (with regard to preventing the bending described at the outset).

Wherever the section is minimal and the thickness of yoke plate 12 per period of reinforcing structure 121 along this section has the higher value, there is a local minimum 1211 of reinforcing structure 121. Thus, at these locations, the yoke plate reinforcement provided by reinforcing structure 121 is the most effective.

In the exemplary embodiments shown in FIG. 1A-B, four local maxima 1211 are provided, as well as the three local minima 1212 located therebetween.

In the case of the illustrated exemplary embodiments, reinforcing structure 121 is formed by a plurality of mutually adjoining reinforcing elements 1215. One reinforcing element 1215 is provided for each period of reinforcing structure 121. The width of each reinforcing element 1215 decreases along the height of the respective lateral side by at least 50%, for example. Therefore, in the case of a triangular reinforcing element, the width would decrease by about 100%. The reinforcing elements are dimensioned in such a way that the width decreases linearly along the height. Due to the decrease in width, local minima 1212 (namely wherever two reinforcing elements 1215 are mutually adjoining) and local maxima 1211 are obtained, which are positioned, for example, in the middle of a respective period.

For each period of reinforcing structure 121, exactly two magnetic periods are provided in the longitudinal direction of secondary part 10, for example. In this exemplary embodiment, the width of each reinforcing element 1215 corresponds to the width of four permanent magnets 13 disposed adjacently in the longitudinal direction.

In accordance with the dimensions mentioned exemplarily further above, a magnetic period has a length of a few centimeters, for example, 32 mm. Permanent magnets 13 are approximately 14 mm wide and configured in a 16 mm grid, for example, thus at a distance ("gap") of 2 mm between individual permanent magnets 13. Therefore, in this example, the magnetic period is 32 mm long.

In the illustrated exemplary embodiments, each reinforcing element 1215 is trapezoidal in shape. In another exemplary embodiment, reinforcing elements 1215 are triangular in shape. Other shapes, such as a sinusoidal shape or the like, are also possible. However, from a standpoint of technical production, reinforcing elements 1215 may extend linearly, as illustrated in the drawings.

Reinforcing structure 121 is milled into yoke plate 12, for example. In another specific embodiment, reinforcing structure 121 is manufactured separately and then fastened to yoke plate 12.

Also provided here is a particular alignment between reinforcing structure 121, on the one hand, and mounting points 111, as well as fastening bores 123, on the other hand.

For each period of reinforcing structure 121, for example, exactly one mounting point 111 and exactly one fastening bore are provided.

Reinforcing structure 121 is configured in such a way on yoke plate 12 that local minima 1212 overlap along the direction of the magnetic path with mounting points 111. Thus, exactly one local minimum 1212 of reinforcing structure 121 of one of yoke plates 12 is assigned to each mounting point 111. Mounting points 111 may also be configured as through-extending cut-outs, for example, as through-extending threaded bores, so that two opposite local minima 1212 of both reinforcing structures 121 of yoke plates 12 are assigned to each mounting point 111.

In the illustrated exemplary embodiments, reinforcing structure 121 is configured in such a way that yoke plate 12 terminates at the two ends thereof in the longitudinal direction in each case with a local maximum 1211. Thus, the two mounting points 111 most proximate to the ends are distant in each case by half of a period of reinforcing structure 121 from the ends, exactly as in the case of the two most proximate minima 1211.

The configuration of mounting points 111 in a grid in accordance with a whole period of reinforcing structure 121 also has the advantage that it permits the mounting of secondary part 10, in an application, precisely in accordance with this grid pitch. This may be advantageous, in particular, in the case of a sequential configuration of a plurality of secondary parts for forming relatively long magnetic paths for primary part 20. Sequentially configured secondary parts 10 are "seamlessly" mutually adjoined, for example, along a straight line, so that, in the application, all coupling sites (thus opposite points) for mounting points 111 of sequentially configured secondary parts 10 may be provided in the mentioned grid pitch (and, in particular, independently of the positions of the transitions among the sequentially configured secondary parts 10).

Moreover, in the illustrated exemplary embodiments, reinforcing structure 121 is configured in such a way that local maxima 1211 overlap with fastening bores 123 in the longitudinal direction. As mentioned, yoke plates 12 are fastened via fastening bores 123 to spacer element 11. The overlap between local maxima 1211, on the one hand, and fastening bores 123, on the other hand, has the advantage that yoke plates 12 are fastened to spacer element 11 at those locations where there is a maximum rigidity of yoke plates 12. In one of the specific embodiments, the respective overlap between local maxima 1211, on the one hand, and fastening bores 123, on the other hand, is not formed or only partially formed at the two ends of secondary part 10; the two (respectively four) fastening bores 123 are slightly offset there toward the middle of secondary part 10, for example, due to spatial geometric requirements.

Other optional features of secondary part 10 are explained with reference to the remaining drawings. In a specific embodiment, for further weight reduction, spacer element 11 features a plurality of through-extending, for example, cylindrical cut-outs 113, as schematically shown in FIGS. 2 and 5. No fastening elements or the like engage into these through-extending cut-outs 113; rather they remain free. The number of through-extending cut-outs 113, as well as the respective diameter are selected in such a way that there is no risk to the stability of secondary part 10 by the weight reduction associated with through-extending cut-outs 113.

As also shown, for example, in FIGS. 3B, 3C and 4B, many exemplary embodiments provide that each reinforcing element 1115 have a thickness that decreases at least in an upper partial region along the height of the respective lateral side. A further weight reduction is thereby achieved. The respective decrease in thickness is obtained, for example, by a chamfer that begins in the upper partial region of respective reinforcing element 1215, for example, at line 1216 located in the upper third of reinforcing element 1215. The chamfer continues to the termination of reinforcing element 1215, for example, in such a way that, upon termination, the thickness merges continuously into the base plate thickness of yoke plate 12, as shown, for example, in FIGS. 3C and 4B.

Moreover, in a specific embodiment, yoke plates 12 are also provided with further, for example, cylindrical cut-outs 129, that may be used during mounting to align the two sides 101, 102 of secondary part 10 to spacer element 11. To this end, for example, alignment pins are guided through cut-outs 129 and held there until the yoke plates are fastened by components 19 and 123. In accordance therewith, the fastening pins are optionally removed or remain in cut-outs 129.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A secondary part, which defines a magnetic path for a primary part of a linear motor, the secondary part comprising:
   a spacer element having a plurality of mounting points that, in an application, are configured to fasten the secondary part; and
   two yoke plates that form lateral sides and are configured to be fastened to the spacer element such that the two yoke plates extend in mutual opposition, orthogonally to the magnetic path, the two yoke plates being configured to accommodate a plurality of permanent magnets on respective inner sides thereof, and the two yoke plates having, on respective outer sides thereof, a reinforcing structure that is formed by a periodic variation of plate thickness in the direction of the magnetic path,
   wherein local minima of the reinforcing structure overlapping with the mounting points along the direction of the magnetic path, and
   wherein each period of the reinforcing structure has a reinforcing element whose width decreases along a height of the respective lateral side.

2. The secondary part as recited in claim 1, wherein each of the two yoke plates terminate, in a longitudinal direction, at both ends with a respective local maximum of the reinforcing structure.

3. The secondary part as recited in claim 1, wherein, for each period of the reinforcing structure, two magnetic periods are provided in a longitudinal direction of the secondary part.

4. The secondary part as recited in claim 3, wherein a magnetic period is composed of two permanent magnets at each of the two yoke plates that are adjacently disposed in alternating polarity and opposite each other in alternating polarity.

5. The secondary part as recited in claim 1, wherein the width decreases by at least 50% and/or the width decreases linearly.

6. The secondary part as recited in claim 1, wherein each of the reinforcing elements has a thickness that decreases at least in an upper partial region along the height of the respective lateral side.

7. The secondary part as recited in claim 6, wherein the respective decrease in thickness is achieved by a chamfer that extends along at least 10% of the overall height of the respective reinforcing element.

8. The secondary part as recited in claim 5, wherein each of the reinforcing elements has a shape of a trapezoid or triangle.

9. The secondary part as recited in claim 5, wherein the local minima of the reinforcing structure are formed by a transition between two adjacent reinforcing elements.

10. The secondary part as recited in claim 1, wherein the two yoke plates have fastening bores that are configured to accommodate a fastener configured to fasten to the spacer element, and wherein local maxima of the reinforcing structures overlap with the fastening bores in the direction of the magnetic path.

11. The secondary part as recited in claim 1, wherein the two yoke plates are configured not to be contacted by fastening elements that engage on the mounting points.

12. The secondary part as recited in claim 1, wherein the two yoke plates have notches that expose the mounting points of the spacer element.

13. The secondary part as recited in claim 1, wherein the spacer element has a plurality of cut-outs that remain free so as to provide a weight reduction.

14. An ironless linear motor comprising a secondary part as recited in claim 1.

15. A secondary part, which defines a magnetic path for a primary part of a linear motor, the secondary part comprising:
   a spacer element having a plurality of mounting points that, in an application, are configured to fasten the secondary part; and
   two yoke plates that form lateral sides and are configured to be fastened to the spacer element such that the two yoke plates extend in mutual opposition, orthogonally to the magnetic path, the two yoke plates being configured to accommodate a plurality of permanent magnets on respective inner sides thereof, and the two yoke plates having, on respective outer sides thereof, a reinforcing structure that is formed by a periodic variation of plate thickness in the direction of the magnetic path,
   wherein local minima of the reinforcing structure overlapping with the mounting points along the direction of the magnetic path, and
   wherein the two yoke plates are configured not to be contacted by fastening elements that engage on the mounting points.

16. A secondary part, which defines a magnetic path for a primary part of a linear motor, the secondary part comprising:
   a spacer element having a plurality of mounting points that, in an application, are configured to fasten the secondary part; and
   two yoke plates that form lateral sides and are configured to be fastened to the spacer element such that the two yoke plates extend in mutual opposition, orthogonally to the magnetic path, the two yoke plates being configured to accommodate a plurality of permanent magnets on respective inner sides thereof, and the two yoke plates having, on respective outer sides thereof, a reinforcing structure that is formed by a periodic variation of plate thickness in the direction of the magnetic path,
   wherein local minima of the reinforcing structure overlapping with the mounting points along the direction of the magnetic path, and
   wherein the two yoke plates have notches that expose the mounting points of the spacer element, and/or the spacer element has a plurality of cut-outs that remain free so as to provide a weight reduction.

17. The secondary part as recited in claim 16, wherein the two yoke plates have notches that expose the mounting points of the spacer element.

18. The secondary part as recited in claim 16, wherein the spacer element has the plurality of cut-outs that remain free so as to provide the weight reduction.

* * * * *